United States Patent [19]

Nakagiri

[11] Patent Number: 4,513,282

[45] Date of Patent: Apr. 23, 1985

[54] LIQUID CRYSTAL MATRIX DISPLAY DEVICE

[75] Inventor: Tadahiko Nakagiri, Tokorozawa, Japan

[73] Assignee: Citizen Watch Company Limited, Tokyo, Japan

[21] Appl. No.: 219,634

[22] Filed: Dec. 24, 1980

[30] Foreign Application Priority Data

Dec. 28, 1979 [JP] Japan .................. 54-173029
Dec. 28, 1979 [JP] Japan .................. 54-173027

[51] Int. Cl.³ .................................. G09G 3/36
[52] U.S. Cl. ........................ 340/765; 340/784; 350/336
[58] Field of Search ........... 340/765, 784; 368/30, 368/29; 350/336

[56] References Cited

U.S. PATENT DOCUMENTS 4,206,459  6/1980  Houryu et al. .................. 340/765
4,291,307  9/1981  Peelle et al. .................. 350/336

FOREIGN PATENT DOCUMENTS

53-90970  8/1978  Japan ......................... 368/30

*Primary Examiner*—David L. Trafton
*Attorney, Agent, or Firm*—Jordan and Hamburg

[57] ABSTRACT

A liquid crystal display device is disclosed which possesses many of the advantages of a dot matrix type of display, with respect to flexibility of changing character or symbol position and size, together with the advantages of a limited number of external connecting leads provided by a segment type of display which can indicate only numerals or symbols of predetermined size at predetermined locations. The display device is based upon a matrix of groups of display segments, with each group or the segments within a group being individually selectable to form numerals and characters using either individual display segments or combinations of groups of display segments.

5 Claims, 25 Drawing Figures

DIGIT ELECTRODE LINES

SEGMENT ELECTRODE LINES

```
1980-12-14    SUN
TIME--AM    3-18-24
AL1---AM    12-54
AL2---PM    11 25
STW---      12-54-18
TIM---      99-99-99
```

LIQUID CRYSTAL MATRIX DISPLAY DEVICE

BACKGROUND OF THE INVENTION

Liquid crystal display devices are in widespread use at present, in various types of equipment. In order to display, for example, numeric data comprising a fixed set of numerics located in predetermined positions, it has been common practice to provide a group of seven display segments, each of which can be independently activated. Such an arrangement enables numerics to be displayed with a relatively small number of interconnecting leads between the liquid crystal display device and the peripheral circuitry which supplies drive signals to excite the display segments. However, this type of display device has the disadvantage of a lack of flexibility. For example, the groups of segments cannot be used to display either numerics or alphabetic characters, as required. In addition, it is not possible to change the position of a numeric or other symbol in a smooth and continuous manner, or to change the size of such a symbol or numeric. Another type of liquid crystal display device is of the dot matrix type. With such a display device, individual "dots" can be independently excited into visibility, by means of signals applied to a set of row and column common electrodes. This type of display device enables numerics, symbols, etc, to be formed anywhere on the display matrix, and to be varied in size and position in a completely free and independent manner. However, it has the disadvantage that the number of interconnecting leads required between the display device and the peripheral drive circuitry is considerably larger than for the first type of display device described above. This is due to the fact that with, for example, a 7-segment type of display arrangement, advantage is taken of the fact that the number of shapes which must be displayed to indicate the various numerics of other symbols is limited, so that by using display segments of a particular shape (generally rectangular) and positioned in a predetermined manner, it becomes necessary to provide only a relatively few interconnecting leads.

There is therefore a requirement for a liquid crystal display device which will provide the advantages of freedom is positioning numerics, alphabetics, etc, capability for changing the sizes of such characters, yet which will not require the large number of interconnecting leads which are necessary with a conventionaly type of dot matrix display device. These requirements are met by a liquid crystal display device according to the present invention.

SUMMARY OF THE INVENTION

It is an objective of the present invention to provide a liquid crystal display device which combines the advantage of a relatively low number of interconnecting leads between the display device and peripheral drive circuitry (such as is provided by prior art types of display device for displaying characters and numerals by means of a matrix of display segments of predetermined shape and position) with the advantage of flexibility in displaying various numerals and characters and of changing the size and position of these (such as is provided by a dot matrix type of display device). In a display device according to the present invention, a plurality of basic segment units are arranged in a matrix array, each of these basic segment units comprising a plurality of elongated display segments arranged in predetermined positions with respect to one another. These basic segment units can be individually excited, or segments within such a unit excited, by means of drive signals applied to digit and segment electrode lines (i.e. row and column matrix drive bus lines). Groups of such basic segment units can be driven in a similar manner to prior art groups of figure-of-eight display segment sets, to form numeric and alphabetic characters. However, the characters or numerals thus formed can be moved over the display area, from side to side, or up and down, in a smooth and continuous manner, with a liquid crystal display device according to the present invention. In addition, the size of a numeral of character can be altered freely, as desired, by increasing the number of segments used to form it. In addition, various sizes of numerals or characters, as well as map displays, graphs, etc, can be displayed by combining two or more of the basic segment units to form a display unit which can be handled in precisely the same way as the dots of a dot type of liquid crystal display. Thus, a liquid crystal display device according to the present invention affords a high degree of display flexibility. However, as will be described with reference to specific embodiments, the wiring connections from the display segment electrodes and external drive circuitry can be provided in a practical and efficient manner.

BRIEF DESCRIPTION OF THE DRAWINGS

FIG. 1A is a diagram illustrating a display segment matrix array according to a first embodiment of the present invention, based on a two-segment basic segment unit, shown in FIG. 1B;

DESCRIPTION OF THE PREFERRED EMBODIMENTS

The present invention is directed toward a liquid crystal display device which comprises a first transparent substrate, made of a material such as glass and having a first pattern of transparent display electrodes formed on a surface thereof together with a pattern of common bus leads (referred to hereinafter as the segment electrode leads) each of which connects to a column of said transparent display electrodes and is coupled to a connector terminal of the liquid crystal display device, for interconnection with external drive circuit means. The display device further comprises a second transparent substrate, having a second pattern of transparent display electrodes formed on a surface thereof, together with a patern of common bus leads (referred to hereinafter as the digit electrode lines), each of which connects to a row of said second transparent display electrodes and is coupled to a connector terminal of the liquid crystal display device. The transparent substrates are positioned parallel to and in proximity to one another, with each of the first pattern of transparent display electrodes being positioned directly opposite a corresponding one of the second pattern of transparent display electrodes, each of the pairs of opposed display electrodes being thus formed serving to define a display segment. A layer of liquid crystal is sandwiched between the transparent substrates. The present invention is solely concerned with a novel arrangement of such display segments of a liquid crystal display device, and, since specific methods of forming such transparent display electrodes and assembling liquid crystal display cells are extremely well known in the art, the physical structure of a liquid crystal display device according to the present invention will not be described in the following specification in detail, for the purpose of brevity of description. Instead, only representative portions of display segment matrix arrays according to the present invention will be shown and described.

Figures 1A, 1B:
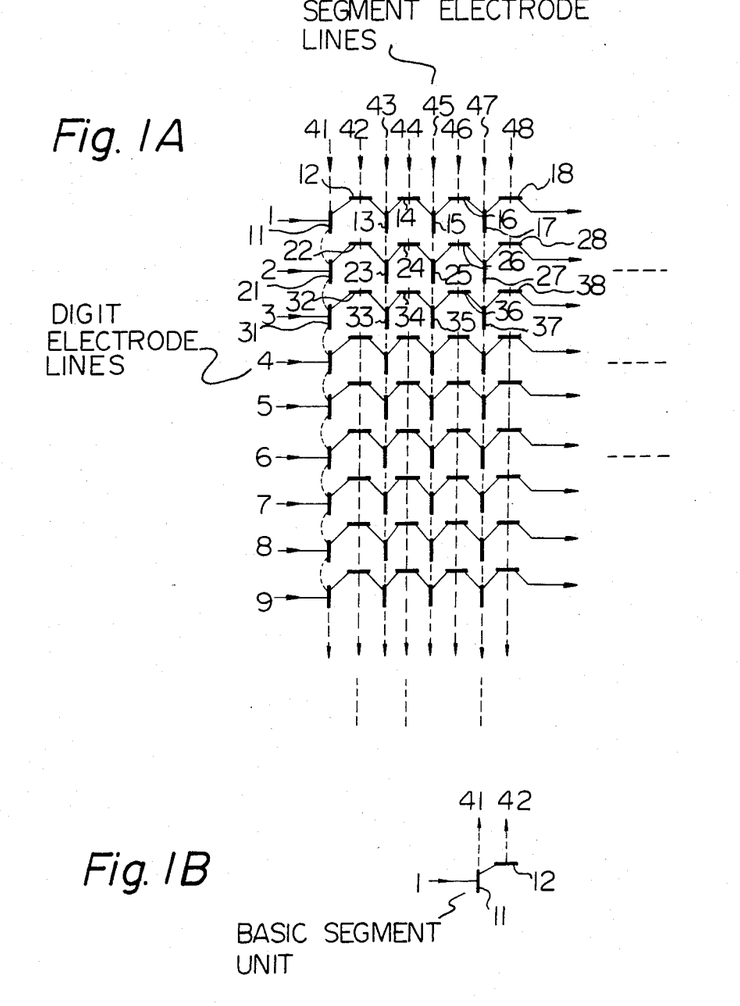

Referring first to FIG. 1A, an arrangement of display segments and of interconnecting leads thereto is shown, according to a first embodiment of the present invention. In FIG. 1A, numerals 1 to 9 denote part of a plurality of digit electrode lines, each of which serves to apply display drive signals from external drive circuitry to a row of display segment electrodes. Numerals 41 to 48 denote part of a plurality of segment electrode lines, each of which serves to apply display drive signals to a column of display segment electrodes. Application of suitable drive signals to a particular digit electrode line and segment electrode line will cause the display segment located at the intersection of these electrode lines to be excited, i.e. made visible. It is an essential feature of the present invention that the display segments of the liquid crystal display device are arranged in the form of a matrix array of basic segment units, one of which is illustrated in FIG. 1B, for the embodiment of FIG. 1A. Each display segment in a liquid crystal display device according to the present invention is of elongated shape. The basic segment unit of FIG. 1B comprises a first one of these display segments, with the longitudinal axis thereof aligned in the column direction, and denoted by numeral 11, and a second display segment with the longitudinal axis thereof aligned in the row direction, as designated by numeral 12. Display segments 11 and 12 are coupled in common to the digit electrode line 1, while the segment 11 is coupled to the segment electrode line 41 and segment 12 is coupled to the segment electrode line 42. Thus, by applying suitable drive signals simultaneously to digit electrode line 1 and to the segment electrode line 41, display segment 11 can be excited, and by applying suitable drive signals simultaneously to digit electrode line 1 and to segment electrode line 42, display segment 12 can be excited. In addition, by simultaneously applying drive signals to digit electrode line 1 and also to both of segment electrode lines 41 and 42, both of segments 11 and 12, i.e. the display segment unit constituted by these segments, can be excited. In other words, the display segments which constitute a basic segment unit can be excited simultaneously or independently. The display of the embodiment of FIG. 1A comprises a matrix array which is made up of a number of rows of said basic segment units, each being coupled to a corresponding one of the digit electrode lines 1 through 9.

With the display embodiment of FIG. 1A, it is possible to form numerals, in a similar manner to that a prior art type of display device having sets of display electrodes arranged in 7-segment figure-of-eight configuration. This can be done, for example, by selecting the display segments 11, 12, 13, 23, 32, 21 and 22, in FIG. 1A, or suitable groups of these segments. Another numeric digit, also of basic figure-of-eight configuration, can be represented adjacent to that just described, by selecting the display segments 15, 16, 17, 27, 36, 25 and 26. In addition, a zero can be formed by selecting the display segments 11, 12, 13 and 22, while a zero can be formed adjacent to the latter one by selecting the display segments 15, 16, 17 and 26. Such zero patterns can be formed as desired, anywhere on the display area, and can be manipulated in the same way as the dots of a dot matrix type of liquid crystal display device. This enables any desired numeral or alphabetic character to be displayed, and also permits the size of the letter or numeral to be increased or decreased freely, as required. In addition, the numeral or alphabetic characters which are produced in this way can be smoothly shifted from side-to-side, or up and down, on the display area. For brevity of description, such a combination of display segments which can be manipulated in the same manner as the dots of a dot-type matrix display will be referred to as segment combination units. Thus, for example, the segment combination unit formed by display segments 11, 12, 13 and 22 can be shifted to the positions formed by the display segments 15, 16, 17 and 26, by making a transition through the display segments 14, 15, 24 and 13. Symbols or alphabetic characters can also be formed by utilizing a plurality of such segment combination units, together with display segments situated between these segment combination units. Alternatively, individual basic segment units can be combined to form numerals or characters of any desired size. For example, all of the segments shown in FIG. 1A could be combined to form a single large figure-of-eight segment group, whereby a single large numeral could be represented.

From the above, it can be understood that a display device according to the present invention such as the embodiment of FIG. 1A can provide many of the advantages of a conventional type of 7-segment matrix display device, i.e. a relatively small number of digit and segment electrode lines being required to drive segments to display numerals or characters, while also conferring much of the advantages of flexibility of forming and positioning characters or numerals, and changing the sized of such characters or numerals, which can be obtained by using a dot matrix type of display device.

Figure 2A:
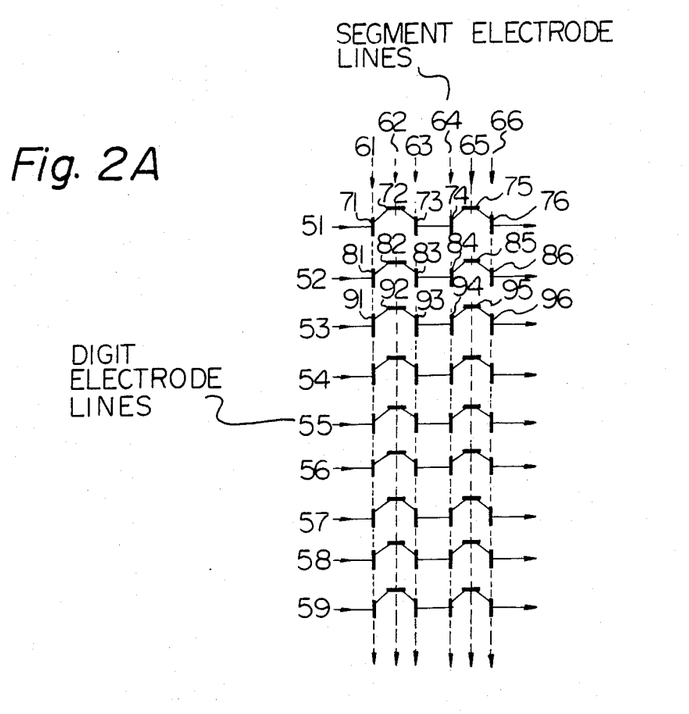
FIG. 2A is a diagram illustrating a display segment matrix array for a second embodiment of the present invention, based upon a three-segment basic segment unit, illustrated in FIG. 2B.
Figure 2B:
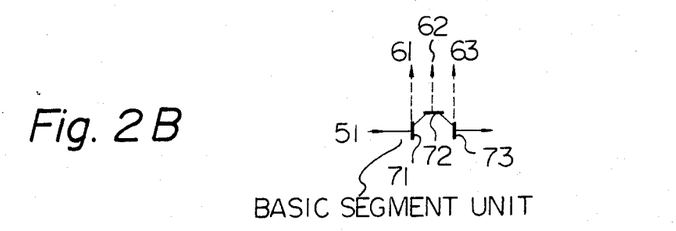

Referring now to FIG. 2A, another embodiment of the present invention will be described. This display embodiment can also be considered to comprise a matrix of display segments formed basically of a plurality of rows of basic segment units, with the basic segment units being of different configuration from those of the embodiment of FIG. 1A. Alternatively, the display embodiment of FIG. 2A can be considered to comprise a plurality of columns of basic segment units, with each column being of ladder configuration. The form of the basic segment units of the embodiment of FIG. 2A is shown in FIG. 2B. In this case, the basic segment unit comprises first and second display segment with the longitudonal axes thereof aligned in the column direction, e.g. as denoted by numerals 71 and 73, and a third display segment which is arranged between the first and second segments and whose longitudinal axis is aligned in the row direction, e.g. segment 72. The embodiment of FIG. 2A can be considered to be basically similar to that of FIG. 1A, with alternate ones of the display segments aligned in the row direction being removed. The number of numeric and alphabetic characters which can be represented by means of the segment array of FIG. 2A is limited, by comparison to that which can be provided by the first embodiment of FIG. 1A. However, for this second embodiment, it can be arranged that specific display segments are always used for particular numerals or alphabetic characters, thereby enabling the decoding circuitry of the drive circuits for the display device to be simplified, and also enabling the number of interconnecting leads between the display device and the drive circuits to be reduced, by comparison with the embodiment of FIG. 1A. In FIG. 2A, numerals 51 through 59 denoted part of the digit electrode lines, while numerals 61 through 66 denote a part of the segment electrode lines. A figure-of-eight 7-segment pattern can be formed by, for example, the display segments 71, 72, 73, 83, 92, 81 and 82. A segment combination unit of minimum size can be formed by, for example, the display segments 71, 72, 73 and 82. Two additional segments can be added to the segment group used to form a figure-of eight pattern, e.g. the segments 91 and 93 can be added to the group of segments 71, 72, 73, 83, 92. 81 and 82. Such additional segments are not required in forming numerics, however they may be used in forming alphabetic characters, decimal points, or other symbols.

Figures 3, 4:
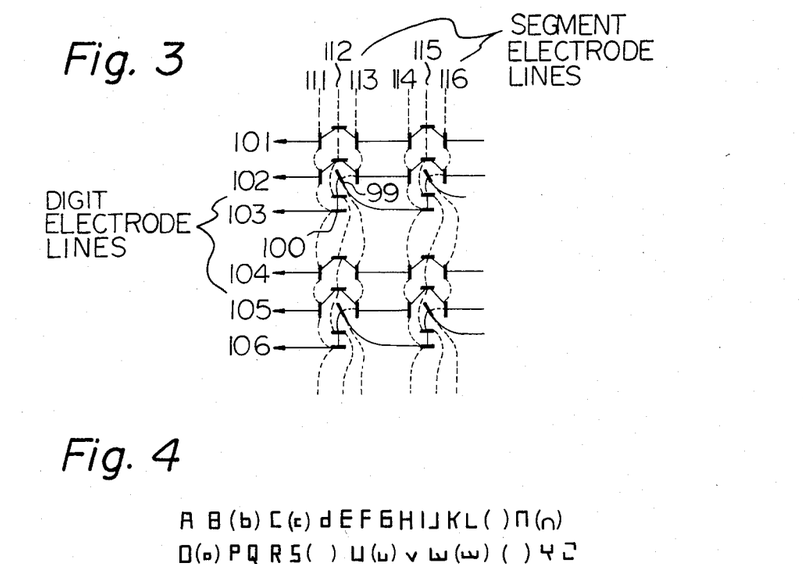
FIG. 3 shows a portion of a display segment matrix array for a third embodiment of the present invention, which includes an obliquely oriented display segment in each of a set of figure-of-eight segment groups.
FIG. 4 shows the alphabetic characters which can be displayed by means of the embodiment of FIG. 3.

Referring now to FIG. 3, a third embodiment of the present invention is shown therein, in which the arrangement of segmens is modified to permit the representation of a large number of alphabetic characters. This arrangement may be considered as basically similar to that of FIG. 2A, with every third row of basic segment units being modified in configuration from that of FIG. 2B. This modification is such as to produce an obliquely-oriented display segment, such as that denoted by numeral 99, and an additional segment oriented in the row direction, as denoted by numeral 100, in each of the basic segment units of every third row of the display. This arrangement has the advantage that the connecting leads of the various segment electrode lines, e.g. of the segment electrode lines 111 to 116 (shown as broken lines) and the digit electrode lines 101 to 106 (shown by full lines) only intersect at the locations of display segments. Thus, there is no danger of spurious excitation of unwanted regions of the display, with the arrangement of FIG. 3. With this embodiment, two rows of numeric or alphabetic characters can be displayed by means of a matrix array which is driven by six digit electrode lines.

FIG. 4 illustrates the alphabetic characters which can be displayed by the display embodiment of FIG. 3. As shown, all of the letters of the alphabet, other than M, T and X can be represented. Display segments such as segment 100 can be used as designation markers for numerals.

Figure 5:
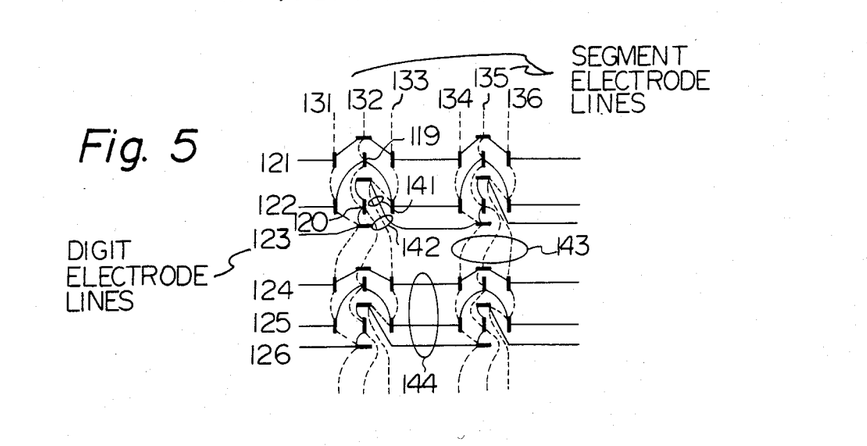
FIG. 5 shows a portion of a display segment matrix array according to a fourth embodiment of the present invention, in which figure-of-eight segment groups are modified to permit the display of the entire letters of the alphabet.

FIG. 5 shows a fourth embodiment of a display matrix according to the present invention, whereby two additional display segments oriented in the column direction, such as 119 and 120, are provided within each basic figure-of-eight display segment group. With this embodiment also, crossovers between the segment electrode lines 131 through 136 and the digit electrode lines 121 through 126 do not occur at any points other than the segment locations. However, there are some positions where a number of segment interconnecting leads must pass through a relatively narrow gap between segments, such as are indicated by numerals 142 and 143. Thus, it is not practicable to form characters or numerals of very small size, with this embodiment. However, at regions denoted by numerals 143 and 144, large spaces can be provided between the interconnecting leads, so that the spacing between the individual figure-of-eight display segment groups can be made quite small. This is advantageous when it is desired to use groups of segment combination units to construct large-size nuemrals or characters, etc.

Figures 6, 7:
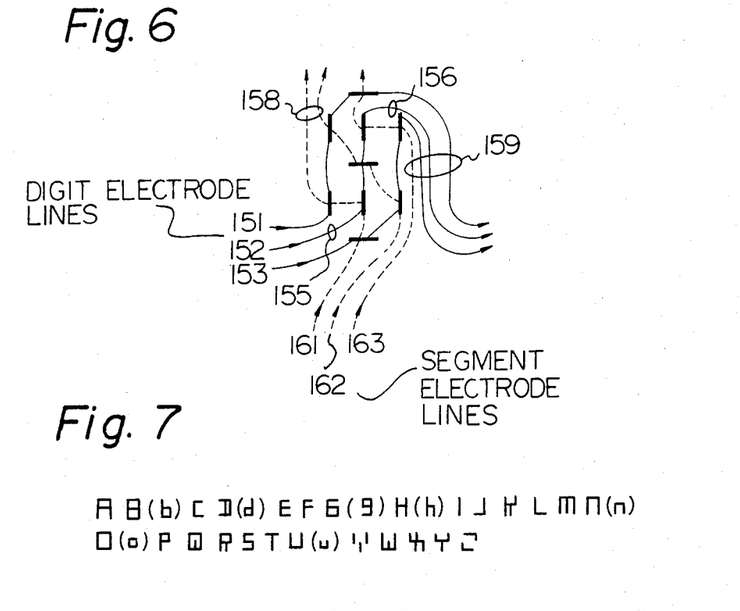
FIG. 6 shows a portion of a display segment matrix array which is an alternative arrangement to that of FIG. 5.
FIG. 7 shows the alphabetic character forms which can be represented by a display device according to the embodiments of FIG. 5 or FIG. 6.

FIG. 6 shows another embodiment of a display segment matrix according to the present invention. For simplicity, only a single figure-of-eight display segment group is shown for this embodiment, which is basically similar to that of FIG. 5. However, the embodiment of FIG. 6 is more suited to the representation of small-size numerals or characters, which are spaced fairly far apart. The differences between the embodiment of FIG. 6 and that of FIG. 5 lie in the manner in which the digit electrode lines 151 to 153 and the segment electrode lines 161 to 163, used in combination to display a single numeral or character, are arranged in relation to the various display segments. The only regions in which connecting leads must run between the display segments are as indicated by numeral 155 and 156. As a result, it is possible to represent quite small-size characters or numerals with this embodiment. However, because of the spacing which must be provided for interconnecting leads, as indicated by numerals 158 and 159, the spacing between each numeral or character must be greater than for the example of FIG. 5.

FIG. 7 shows the various alphabetic character patterns which can be displayed by means of the display embodiments of FIG. 5 and FIG. 6. As shown, all of the letters of the alphabet can be displayed by these embodiments.

Figure 8:
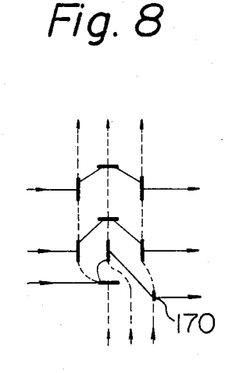
FIG. 8 shows a portion of a display segment matrix array which is a second alternative arrangement to that of FIG. 5.

Referring now to FIG. 8, another embodiment of a display matrix arrangement according to the present invention is shown, again with reference only to a single figure-of-eight group of display segments of that matrix. This embodiment is basically similar to that of FIG. 5, however in the embodiment of FIG. 8, the position of one of the display segments in the figure-of-eight groups, such as that denoted by numeral 170, is arranged such that this segment may be used to indicate the decimal point.

Figures 9, 10:
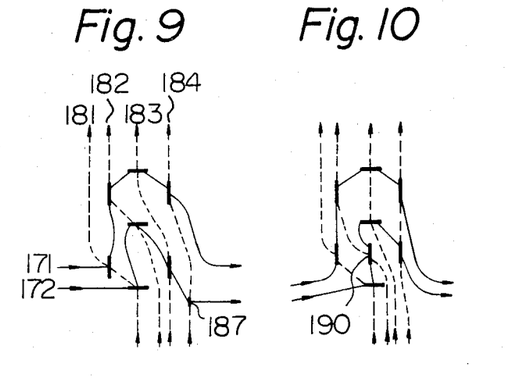
FIG. 9 shows a portion of a display segment matrix array according to the present invention, whereby a row of figure-of-eight display segment groups can be driven by only two digit electrode lines.
FIG. 10 shows a portion of a display segment matrix array which is a modification to that of FIG. 9.

FIG. 9 shows another embodiment of a display matrix arrangement according to the present invention, again shown with reference to only a single figure-of-eight segment group of the display matrix. With this embodiment, a plurality of rows of digits or characters can be represented by a corresponding plurality of rows of display segments, each controlled by a pair of digit electrode lines such as those denoted by numerals 171 and 172, with each numeral or character being selected by means of a set of four segment electrode lines such as are denoted by numerals 181 to 184. A display segment 187 may be used to indicate the decimal point.

Referring now to FIG. 10, another figure-of-eight display segment group for an embodiment of a display matrix according to the present invention is shown. This arrangement is similar to that of FIG. 9. A point of difference is that in the embodiment of FIG. 10, a display segment 190, which can be used to indicate the decimal point, is disposed within the figure-of-eight display segment group. The embodiment of FIG. 10 enables the set of alphabetic characters shown in FIG. 4 to be represented.

Figure 11:
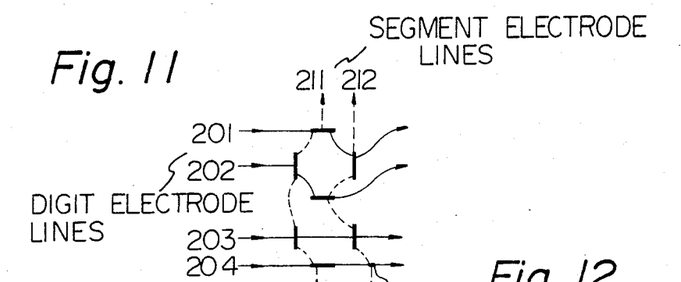
FIG. 11 shows a portion of a display segment matrix array according to the present invention, whereby each of a set of figure-of-eight display segment groups can be driven by means of four digit electrode lines and only two segment electrode lines.

FIG. 11 shows another embodiment of a display matrix arrangement according to the present invention, with reference to a single figure-of-eight display segment group of that display matrix. This embodiment is designed to reduce the number of interconnecting leads between the liquid crystal display device and the peripheral drive circuits, by reducing the number of segment electrode lines which are required to drive each numeral or character. Each figure-of-eight display segment group is driven by means of as set of four digit electrode lines, such as denoted by numerals 201 to 204, and by only two segment electrode lines, such as are denoted by numerals 211 and 212. A decimal point can be indicated by display segment 213.

Figure 12:
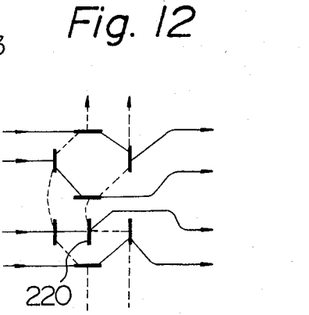
FIG. 12 shows a portion of a display segment matrix array which is a modification of that shown in FIG. 10.

Another embodiment of the basic figure-of-eight pattern on a display matrix according to the present invention is shown in FIG. 12. This is basically similar to the embodiment of FIG. 11, but with a segment utilizable for decimal point indication being disposed within the basic figure-of-eight display segment group, as denoted by numeral 220.

Figure 13:
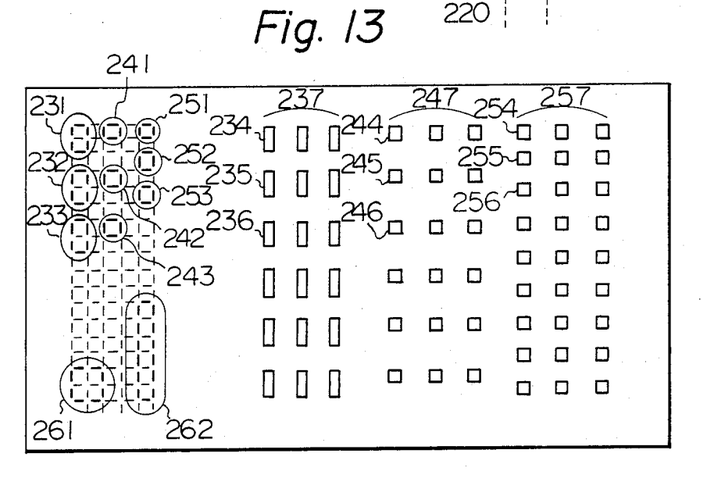
FIG. 13 is a diagram illustrating the way in which combinations of basic segment units can be formed into various patterns, in a similar manner to the dots of a dot matrix segment array.

Referring now to FIG. 13, a diagram is shown to illustrate how various segment combination units may be used to form display patterns. It should be noted that such segment combination units may be formed with any of the display matrix embodiments described hereinabove. However, some of the embodiments, such as that of FIG. 1A, are particularly suited to the formation of display patterns by means of groups of segment combination units. Reference numerals 231 through 233 denote elongated rectangular segment combination units, each formed by a group of six display segments, as indicated by the thick lines. A pattern of such rectangular segment combination units is denoted by numeral 237. Segment combination units of minimum size, i.e. made up of four display segments, are denoted by numerals 241 through 253. A matrix pattern of such segment combination units is denoted by numeral 247. Another matrix pattern, in which the segment combination units are spaced more closely together, is denoted by numeral 257. It is also possible to form segment combination units of larger size, i.e. of larger square shape, as denoted by numeral 261, or of extended rectangular shape, as indicated by numeral 262. All of the various segment combination units and patterns shown in FIG. 13 can be formed by any of the display matrix embodiments described hereinabove.

Figure 14:
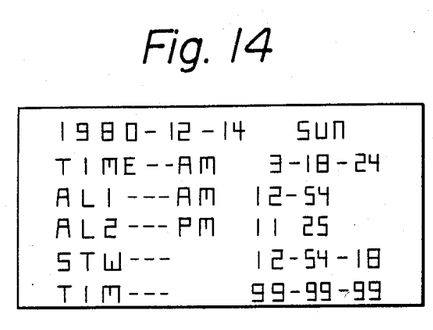
FIG. 14 is a diagram illustrating a first example of a display utilizing a liquid crystal display device according to the present invention.

FIG. 14 shows an example of an information display which can be provided by a display device such as that of the embodiment of FIG. 5. Information displayed includes the year and date, the day of the week (Sunday), the current time (3.18:24 AM), an alarm AL 1, which is set for a time of 12.54 AM, etc.

Figure 15:
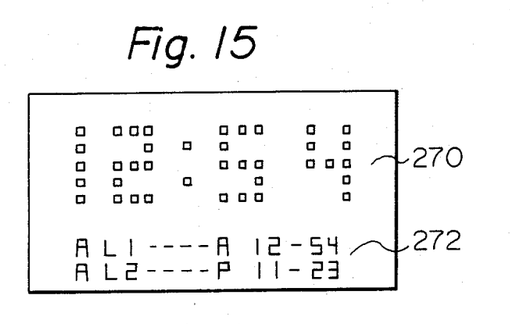
FIG. 15 is a second example of a display which can be formed by using a liquid crystal display device according to the present invention.

FIG. 15 is a diagram illustrating the way in which a display segment matrix according to the present invention can indicate, for example, the current time information, by means of large numerals which are each formed of a plurality of segment combination units, as denoted by numeral 270. Alarm time information can be formed by characters and numerals of smaller size, i.e. which are formed using the figure-of-eight segment patterns described hereinabove, and denoted by numeral 272. It should be noted that the information displayed can be shifted in a continuous manner, from side to side, or up and down, since the display segment matrix pattern is basically continuous.

Figure 16:
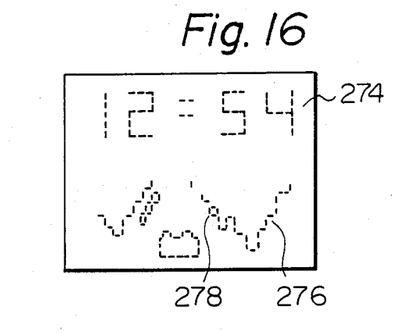
FIG. 16 is a diagram illustrating another example of a display which can be formed by a liquid crystal display device according to the present invention, which includes a world map and time display.

FIG. 16 shows another example of display patterns which can be provided by a display segment matrix type of liquid crystal display device according to the present invention. The display patterns indicate the current time, as denoted by numeral 274, and a world map portion, denoted by numeral 276. Due to the flexibility of a display matrix according to the present invention, it is possible to show a portion of the world map in enlarged form, while the location of a city whose current time is being displayed can be indicated by a marker which is movable across the display area, as denoted by numeral 278.

Figure 17:
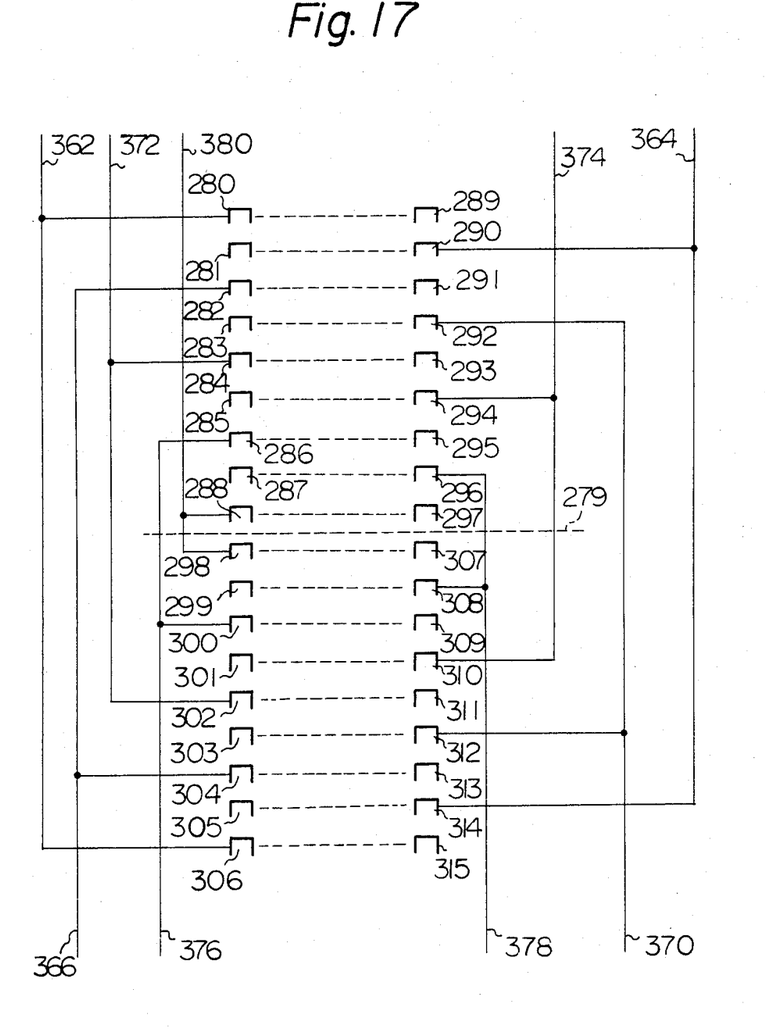
FIG. 17 is a diagram illustrating an example of a method of efficiently forming interconnections between the digit electrode lines of a display segment matrix such as that of FIG. 2A and external circuitry.

In order to facilitate the manufacture of a liquid crystal display device of matrix configuration, it is desirable that the interconnecting leads between the display segment matrix and the connector terminals of the display device (e.g. the digit electrode lines and segment electrode lines in the described embodiments) should be arranged in as simple and efficient a manner as possible, e.g. with a maximum separation between these interconnecting leads and between the connector terminals. FIG. 17 is an example showing how the digit electrode leads for a display device such as the embodiment of FIG. 1A may be efficiently arranged. Numerals 280 to 315 denote an array of basic segment units, such as are illustrated in FIG. 1B and 2B. In this example, 18 rows of basic segment units are provided, while only the two outermost columns of basic segment units are shown in the diagram. The display matrix is broadly divided into two sets of basic segment units, lying on either side of a center line denoted by numeral 279, i.e. the set of basic segment units from 280 to 297 and the set from 298 to 315. As shown, alternate rows of the basic segment units in one half of the matrix are connected to corresponding rows in the opposite half of the display matrix. Thus, for example, the digit electrode line of the row of basic segment units extending from numeral 288 to 297 is connected in common with the digit electrode line of the row of basic segment units which extends from numeral 298 to 307. Similarly, the next two rows of basic segment units, moving outward from the center line 279, i.e. extending from numeral 287 to 296 in the upper half of the display matrix and from numeral 299 to 308 in the lower half of the matrix, are connected in common, to a conductor lead 378. Each of the conductor leads 362, 364, 366, 370, 372, 374, 376, 378 and 380, arranged symmetrically on each side of the display matrix as shown, is connected to a corresponding terminal of the liquid crystal display device connector, whereby drive signals are coupled to the display device from external drive circuitry.

In order to enable the pairs of rows of basic segment units which are connected in common to be driven independently of one another, it is of course necessary to divide the segment electrode lines into two sets each of which serves to drive one half of the display matrix. Thus, for example, three segment electrode leads in an upper set of segment electrode leads would drive the column of basic segment units extending from numeral 280 to 288, while another three segment electrode leads, in a lower set of segment electrode leads, would drive the column of basic segment units which extends from numeral 298 to 306.

Figure 18:
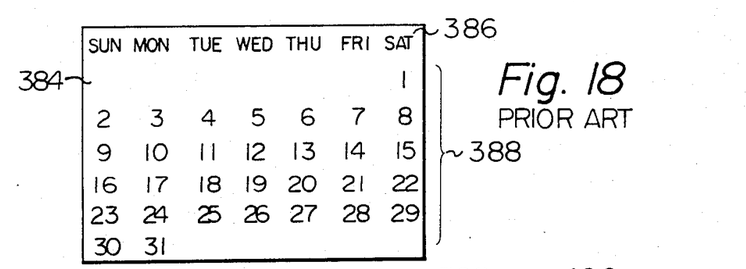
FIG. 18 is an example of a calendar display for a timepiece according to the prior art.

A specific application of a liquid crystal display device according to the present invention will now be described. This application is that of an electronic timepiece display having a calendar display mode in which all of the days of month are displayed simultaneously. Referring first to FIG. 18, a date display for a timepiece according to the prior art is shown. This comprises a weekdays display area 386 and a days-of-the-month display area 388. The weekday Sunday appears on the left of the display, in in this example. With this prior art type of calendar display, if the first day of a month should appear at the rightmost position of the weekdays display area 386, (e.g., Saturday, in this example) then it is necessary to provide six rows of numerals to display the days-of-the-month (assuming that there are 30 or 31 days in the month)

Figure 19:
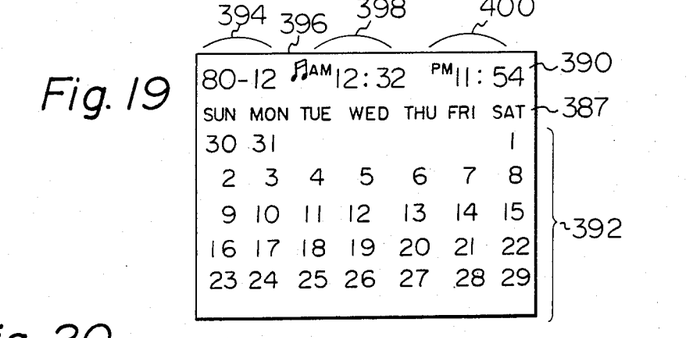
FIG. 19 is an embodiment of a liquid crystal display for providing calendar, current time and alarm informations, utilizing a segment matrix according to the present invention.

Referring now to FIG. 19, an embodiment of a calendar display for an electronic timepiece, using a display device according to the present invention, is shown. In the embodiment of FIG. 19, if the first day of the month appears at the right-hand side of the display, e.g. in this example, on Saturday, and there are 30 or 31 days in the month, then the 30th and 31st days at the end of the month are displayed in the same row of numerals as the first day of the month, i.e. in the topmost row of numerals of the days-of-the-month display secition 392. Thus, in the example of FIG. 19, the 30th and 31st days of the month appear below the Sunday and Monday positions of the weekdays display area 387. It should be noted that the positions of the dates in the topmost row of the days-of-the-month display section 387 are not fixed. Thus, for example, if in a particular month the first day should occur on a Friday, then the numeral 1 would appear below the Friday indication of area 387, the numeral 2 beneath the Saturday position, and the numeral 31 would appear below the Sunday position (assuming that the month has 31 days). The important feature of this embodiment is that the 30 and 31st days are indicated within the blank region of the topmost row of numerals of the days-of-the-month display area 392, to the left of the first day of the month. The characters of the weekdays display section 387 are of course fixed, and can be printed upon the display device surface.

Although at first sight it might appear that such an arrangement might lead to confusion, in that the user might assume that the numerals 30 and 31 refer to the last days of the previous month, in fact such confusion does not arise. This is because most people are very accustomed to a conventional type of calendar display in which the relationship between the last days of the month and the other days are as shown in FIG. 19, but with the numerals for the last days of the month appearing on the bottom line of the calendar display. The user can rapdily become accustomed to a days-of-the-month display as shown in FIG. 19, and confusion does not arise, in practice.

The arrangement of FIG. 19 has the advantage that, with a display matrix capable of displaying six rows of numerals, five of these rows can be used to form a days-of-the-month section, while the sixth row can be used to display current time and other information. Such a row of displayed information is denoted by numeral 390 in FIG. 19. This row includes a year and month display area 394, an alarm symbol 396, an alarm time section 398, and a current time section 400. As shown, the information in row 390 can be displayed by means of numerals which are larger than those of the days-of-the-month display section 392, in order to facilitate discrimination between the two sets of information. 14 digits are provided in each row of the days-of-the-month display section 392, i.e. two digits for each of the days of the week, for a total of 14 digits. It is possible to arrange that the Sunday or Saturday column is displayed in color, or to print the characters in the weekdays section 387 in color.

It should be noted that, by displaying the year and month in section 394, the user is notified that the 30 and 31st days of the month are those of the current month (i.e. December, for the example of FIG. 19).

It should also be noted that it is equally possible to position the display row 390 at the bottom of the display, rather than at the top as in this example.

Figure 20:
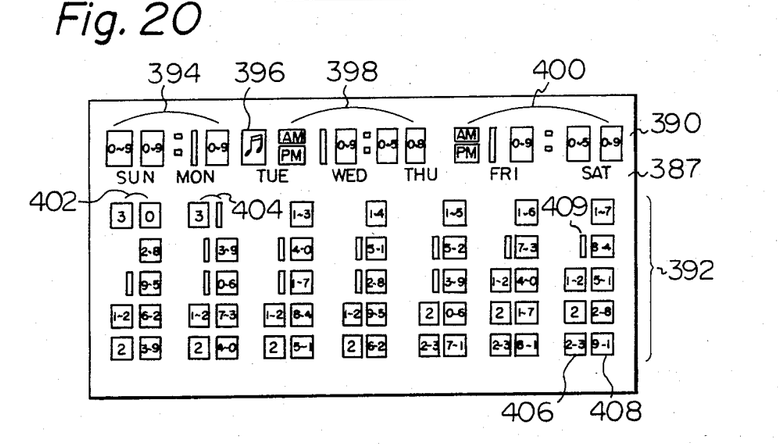
FIG. 20 is a diagram illustrating various possible combinations of digits necessary in the display embodiment of FIG. 19.

Referring now to FIG. 20, the various combinations of digits which must be provided in each display stage of the example of FIG. 19 are shown. For example, the squares 406 and 408 indicate that only the digits 2 and 3 are possible choices for the numeral at 406, while digits 9, 0 and 1 are the possible choices for the numeral at 408. Reference numeral 409 denotes a display segment which can only form the digit 1, and which is otherwise left in the non-excited state. In the areas denoted by numeral 402, only the numeral 30 can be displayed. Otherwise, these digits are left in the non-excited state. Similarly, the numeral denoted by 404 can only indicate 31, and is otherwise left in the non-excited state.

Figure 21:
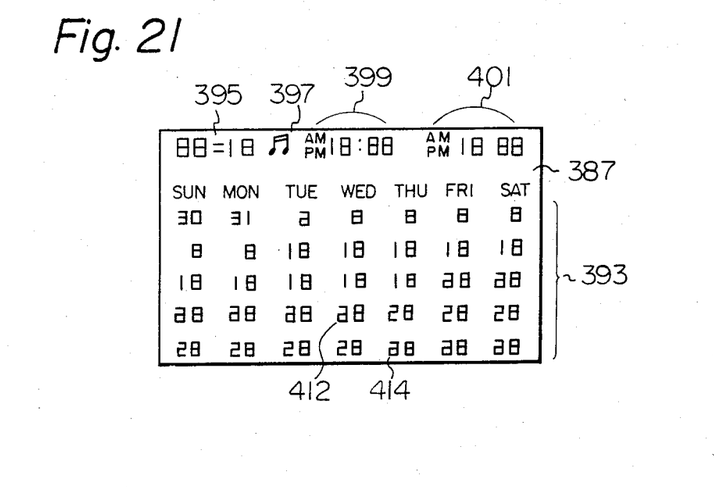
FIG. 21 is a diagram illustrating the display segment pattern which must be provided to form the display of FIG. 19.

FIG. 21 shows the various segment patterns which must be provided in order to satisfy the conditions shown in FIG. 20. All of the numerals are formed by basic figure-of-eight display segment groups, except for the AM and PM characters and the alarm symbol and colon mark. Such characters and symbols can each be provided by a single display segment of suitable shape, which is either held in the excited or in the non-excited state.

Figure 22:
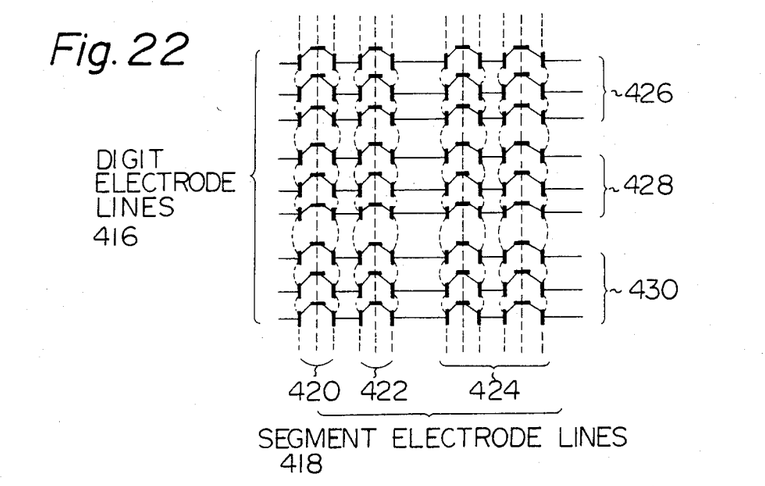
FIG. 22 is a diagram illustrating a portion of a display segment matrix according to the present invention which is applicable to the display of FIG. 19.

FIG. 22 shows a suitable arrangement of a display segment matrix according to the present invention, for the display shown in FIG. 19. The arrangement of display segments in FIG. 22 is similar to that of FIG. 2A, described hereinabove, being based upon a matrix array of basic segment units each comprising three display segments, as shown in FIG. 2B. Each of the digits of the display is formed by a set of nine display segments comprising three basic segment units, with each row of digits thus formed being driven by a set of three digit electrode lines, e.g. as denoted by numerals 426, 428 and 430. In the column direction, each digit is driven by a set of three segment electrode lines, as denoted by numerals 420 and 422. Pairs of these sets of three segment electrode lines are grouped together, as denoted by numeral 424 for example. In this example, the pairs of digits are spaced slightly apart, by separating each pair of columns of basic segment units slightly apart, while the rows of digits are also spaced slightly apart. Selection of a particular digit can be performed by appropriately driving the corresponding set of segment electrode lines (e.g. 420) and digit electrode lines (e.g. 426).

Figure 23:
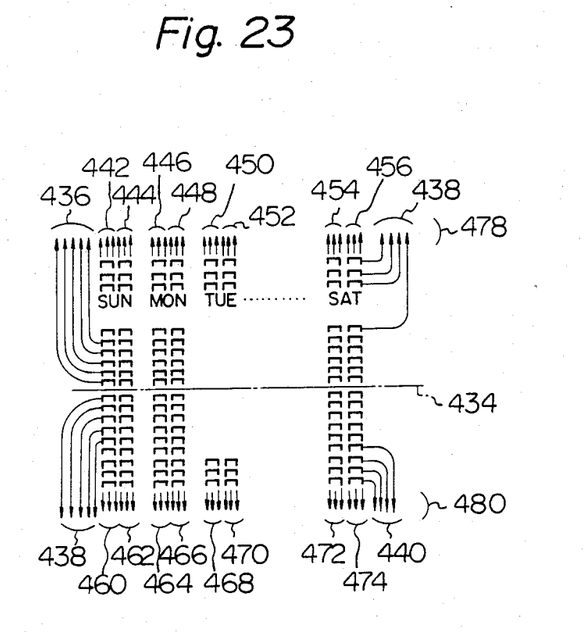
FIG. 23 is a diagram illustrating an efficient arrangement of wiring interconnections between the connector terminals of a liquid crystal display device and the segments of a matrix array such as that of FIG. 22, for the embodiment of FIG. 19.

Referring now to FIG. 23, an efficient arrangement for connecting the segment and digit electrode lines to the terminals of the liquid crystal display cell connector is shown, which is suitable for the display illustrated in FIGS. 19 and 22. As shown, the display segments are divided into two symmetrical groups of basic segment units, on either side of a center line 434 in the row direction. Each of these two groups of display segments is further divided into two approximately equal groups of rows of basic segment units, i.e. five rows which are connected to digit electrode lines 436 and three rows which are connected to a set of digit electrode lines 438, in the case of the upper group of display segments, and five rows which are connected to digit electrode line set 438 and three rows which are connected to digit electrode line set 440, for the lower group of display segments. As shown, the groups of digit electrode lines 438 and 436 are led out from the right and left of the display respectively, to an upper set of terminals of the display device connector, as denoted by numeral 478. The groups of digit electrode lines 438 and 440 are led out from the right and left of the display respectively, to a lower set of terminals of the display device connector, as denoted by numeral 480. The sets of three segment electrode lines which drive the upper set of display segments are denoted by numerals 442 to 456 and are, as shown, led out from the top of the display to the connector terminals 478. the sets of three segment electrode lines which drive the lower set of display segments, and which are independent of the upper set of segment electrode lines, are denoted by numerals 460 to 474, and are led out from the bottom of the display toward the connector terminals 480.

It can be seen that the arrangement of FIG. 23 provides a simple and efficient pattern of connecting leads between the display segments and the connector terminals of the display device, without any need for intersections between these connecting leads in areas other then the locations of display segments. A display device for providing the display shown in FIG. 19 can therefore be manufactured in a practicable and economic manner, by utilizing a display segment matrix according to the present invention.

It should be noted that, if the numerals of the upper row of the display shown in FIG. 19, i.e row 390, are made larger than those of the days-of-the-month display section 392, then it will be necessary to make the size of each display segment in the upper row 390 greater than that of the display segments of the rest of the display matrix. However, this in no way affects the validity of the interconnecting lead arrangement which is shown in FIG. 23.

The method of driving the display segment matrix embodiments of the present invention described hereinabove will not be described, since such methods, i.e. time-sharing application of drive signals to the digit and segment electrode lines, are very well known in the art. It will be apparent that by applying such methods, any particular display segment may be selected for excitation as required, to be used in forming a numeral or character, or for providing an indicating marker to designate a numeral or to connect a pair of numerals, etc.

From the above description, it will be apparent that a liquid crystal display device having a display segment matrix arrangement according to the present invention, either in the form of a uniform continuous matrix as in the embodiments of FIGS. 1A and 2A, or modified by positioning certain segments to facilitate the display of alpahabetic characters, as in the embodiments of FIGS. 3, 5, 6, 8, 9, 10, 11 and 12, can provide many of the advantages of a conventional type of display matrix having display segments of predetermined size, shape and position, i.e the advantage of a relatively low number of interconnecting leads between the display device and peripheral drive circuitry, together with the advantages of a dot matrix type of liquid crystal display device, i.e. the capability of combining groups of display segments to form various sizes of numeral or alphabetic characted, maps, graphs, etc, and for freely moving displayed information as required.

From the preceding description, it will be apparent that the objectives set forth for the present invention are effectively attained. Since various changes and modifications to the above construction may be made without departing from the spirit and scope of the present invention, it is intended that all matter contained in the above description or shown in the accompanying drawings shall be interpreted as illustrative, and not in a limiting sense. The appended claims are intended to cover all of the generic and specific features of the invention described herein.

What is claimed is:

1. In a liquid crystal display device having a first transparent substrate with a first set of transparent segment electrodes formed thereon and a second transparent substrate with a second set of transparent digit electrodes formed thereon in positions corresponding to said first set of transparent electrodes, and a layer of liquid crystal enclosed between said first and second substrates, whereby a set of display segments is defined with each display segment being formed by one of said first set of transparent electrodes in conjunction with a corresponding one of said second set of transparent electrodes, the improvement whereby each of said display segments is of elongated shape and whereby said set of display segments comprises a matrix array of basic segment units, each of said basic segment units comprising at least a first display segment and a second display segment with the axes of elongation thereof orientated in mutually different directions, the improvement further comprising a plurality of digit electrode lines for applying drive signals to said display segments, each of said digit electrode lines being coupled to a row of said basic segment units in said matrix array, and a plurality of segment electrode lines each of which is coupled to a column of said display segments, each of said display segments being responsive to simultaneous application of drive signals to a corresponding digit electrode line and segment electrode line for being driven into excitation, with there being an even number of rows of said basic segment units with alternate ones of said digit electrode lines being positioned on opposite sides of a median axis of said matrix array of basic segment units, and with pairs of said digit electrode lines which are symmetrically disposed with respect to said median axis being connected in common.

2. The improvement according to claim 1, in which each of said basic segment units comprises a first display segment and a second display segment which are positioned to form adjacent sides of a rectangle.

3. The improvement according to claim 1, in which each of said basic segment units comprises first, second and third display segments which are positioned to form three sides of a rectangle.

4. The improvement according to claim 1, in which each basic segment unit of at least one row of said basic segment units further comprises at least one additional display segment which is oriented at an oblique angle with respect to another display segment of that basic segment unit.

5. In a liquid crystal display device having a first transparent substrate with a first set of transparent segment electrodes formed thereon and a second transparent substrate with a second set of transparent digit electrodes formed thereon in positions corresponding to said first set of transparent electrodes, and a layer of liquid crystal enclosed between said first and second substrates, whereby a set of display segments is defined with each display segment being formed by one of said first set of transparent electrodes in conjunction with a corresponding one of said second set of transparent electrodes, the improvement whereby each of said display segments is of elongated shape and whereby said set of display segments comprises a matrix array of basic segment units, each of said basic segment units comprising at least a first display segment and a second display segment with the axes of elongation thereof orientated in mutually different directions, the improvement further comprising a plurality of digit electrode lines for applying drive signals to said display segments, each of said digit electrode lines being coupled to a row of said basic segment units in said matrix array, and a plurality of segment electrode lines each of which is coupled to a column of said display segments, each of said display segments being responsive to simultaneous application of drive signals to a corresponding digit electrode line and segment electrode line for being driven into excitation, each of said basic segment units comprising a first display segment which is aligned with the longitudinal axis thereof parallel to a column direction of said matrix array and a second display segment which is aligned with the longitudinal axis thereof parallel to a column direction of said matrix array, and a third display segment which is aligned with the longitudinal axis thereof parallel to said row direction whereby said first, second and third display segments are arranged in positions corresponding to three sides of a rectangle, and in which said display device serves to provide a display of calendar data and also a set of other data including at least current time data by formation of at least numeric digits, with a plurality of adjacent ones of said rows of basic segment units serving to display said current time data and the remainder of said rows of basic segment units serving to display said calendar data, said display device comprising a first half thereof containing rows of basic segment units including at least three rows of basic segment units for indicating said current time data, two sets of three rows of basic segment units for indicating two rows of days of the month, and a second half thereof containing rows of basic segment units including three sets of three rows of basic segment units for indicating three rows of days of the month, with the 30th and 31st days of the month being indicated by numerals displayed in the same row of said calendar data as the first day of the month.

* * * * *